April 19, 1927.  W. G. SCHNEIDER  1,625,335

CONTAINER COVER

Filed Dec. 14, 1925

WITNESSES

INVENTOR

Patented Apr. 19, 1927.

1,625,335

UNITED STATES PATENT OFFICE.

WILLIAM G. SCHNEIDER, OF CAMDEN, NEW JERSEY.

CONTAINER COVER.

Application filed December 14, 1925. Serial No. 75,298.

My invention is an improvement in container covers, in which the container cover is combined with an eating utensil, and wherein the said utensil may be easily detached from the cover for use.

The object of my invention is to provide a cover for ice cream or other products, having an eating utensil integral therewith, the utensil being scored in the cover, around its edges, in such manner that it may be readily separated from the cover.

Another object of the invention is to provide a combination cover and utensil that may be easily and cheaply manufactured, thereby reducing the expense incurred in manufacturing such covers and utensils separately, and the provision of such utensil separately when serving the product of the container.

A further object of my invention is to provide a closure or cover for containers having a continuous unbroken rim, the closure or cover being provided with an upwardly extending tab so that the cover may be readily removed from the container, the tab forming a part of the handle of such utensil, which, is integral with, but separable from the cover or closure.

The improvement claimed is hereinafter fully set forth.

Figure 1:
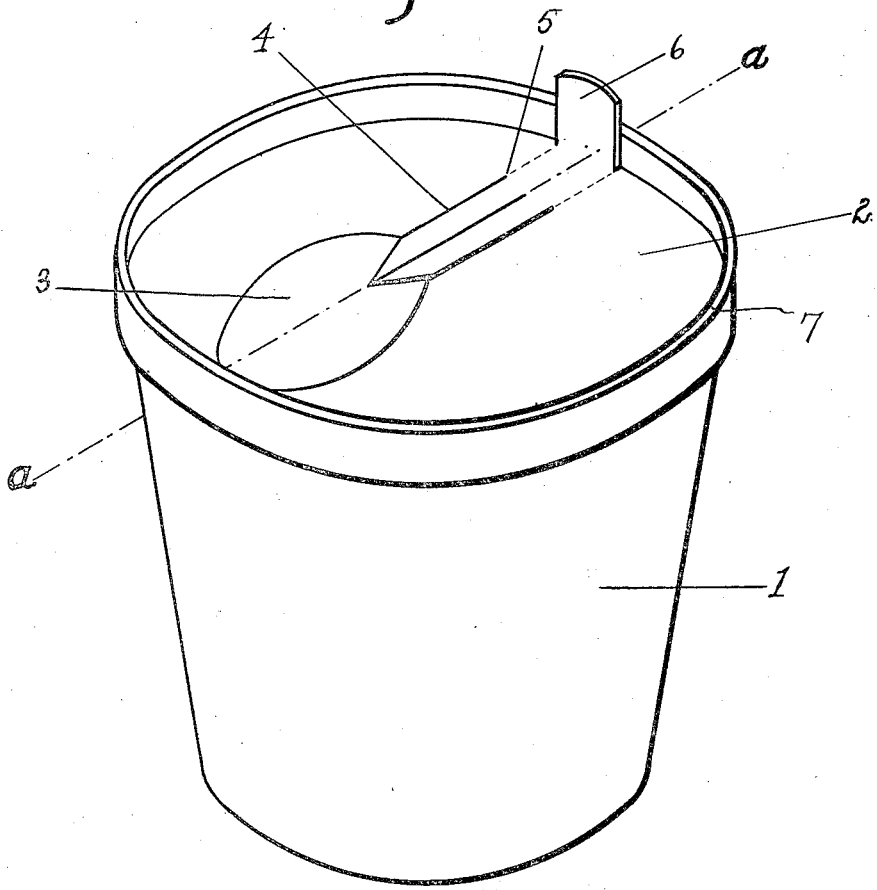
Figure 2:
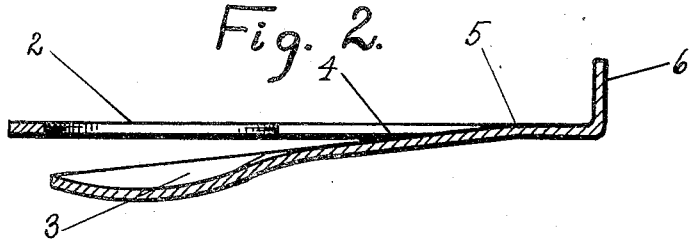

In the acompanying drawing, Figure 1 is a perspective view of a container and cover; and, Fig. 2 a sectional view of the cover taken on the line a a of Fig. 1.

In the practice of my invention, the container, 1, having a continuous unbroken rim, 7, is provided with a suitable cover plate, 2, manufactured of pressed paper, or other suitable material, and having a depression in the shape of the bowl of a spoon, 3, therein, the handle portion, 4, of the spoon being heavily scored in the cover, up to a point, 5, near its edge, in such manner that it is readily separated from the cover.

From the point, 5, the scoring is not so pronounced, but is sufficiently heavy to allow the spoon, 3, to be broken, with the attached handle, from the cover. An upwardly extending tab, 6, is provided with this type of cover, so that it may be easily removed from the container.

Among the advantages of my invention will be observed the possibility of utilizing any type of container having an enclosing rim and seat for a cover or closure, without the necessity of destroying the sealing qualities of such enclosing rim, or, its resistance against rupture by reason of internal or external pressure.

I claim as my invention and desire to secure by Letters Patent:

1. A closure for containers having a continuous unbroken rim, comprising: a detachable portion having an upwardly extending tab end said detachable portion being bounded substantially throughout its entire margin by the remainder of the closure, and adapted to serve as an eating utensil when detached from said remainder; and a connection between the separable portion and the remainder, of sufficient weakness to permit said portion to be readily detached from the remainder by a pull of the fingers.

2. A closure for containers having a continuous unbroken rim, comprising: a detachable depressed portion having an upwardly extending tab end said detachable portion being bounded substantially throughout its entire margin by the remainder of the closure, and adapted to serve as an eating utensil when detached from said remainder, and a connection between the detachable portion and the remainder of sufficient weakness to permit said portion to be readily detached from the remainder by a pull of the fingers.

3. A cover for containers having a continuous unbroken rim, said cover comprising: a mouth closing wall, a detachable portion having an upwardly extending tab end constituting a part of and extending into said wall, said detachable portion being adapted to serve as an eating utensil when detached; and a connection between the detachable portion and the remainder of the wall of sufficient weakness to permit said portion to be readily detached by a pull of the fingers.

4. An eating utensil having an upwardly extending tab end said utensil being bounded substantially throughout its entire margin by a detachable portion forming a mouth closing wall adapted to serve as a closure for containers having a continuous unbroken rim, said detachable portion being of sufficient weakness to be readily separated from the utensil by a pull of the fingers.

WILLIAM G. SCHNEIDER.